(No Model.)

J. R. MERCEREAU.
ROAD CART.

No. 456,581. Patented July 28, 1891.

WITNESSES.
Ida C. Barnard
Alvan Macauley

INVENTOR.
James R. Mercereau
Church & Church
his ATTORNEYS

UNITED STATES PATENT OFFICE.

JAMES R. MERCEREAU, OF ROCHESTER, NEW YORK.

ROAD-CART.

SPECIFICATION forming part of Letters Patent No. 456,581, dated July 28, 1891.

Application filed April 27, 1891. Serial No. 390,652. (No model.)

*To all whom it may concern:*

Be it known that I, JAMES R. MERCEREAU, of the city of Rochester, county of Monroe, and State of New York, have invented certain new and useful Improvements in Road-Carts; and I do hereby declare the following to be a full, clear, and exact description of the same, reference being had to the accompanying drawings, forming a part of this specification, and to the letters of reference marked thereon.

My present invention relates particularly to road-carts, though possessing features applicable to other vehicles, and has for its object to provide a spring-support for the body on the axle, so that it will be easy, and also means whereby the body may be adjusted relative to the springs or the axle, as may be desired; and to these and other ends that will readily occur to those skilled in the art, the invention consists in certain novelties of construction and combinations of parts, all as will be hereinafter fully described, and the novel features pointed out in the claims at the end of the specification.

Figure 1:
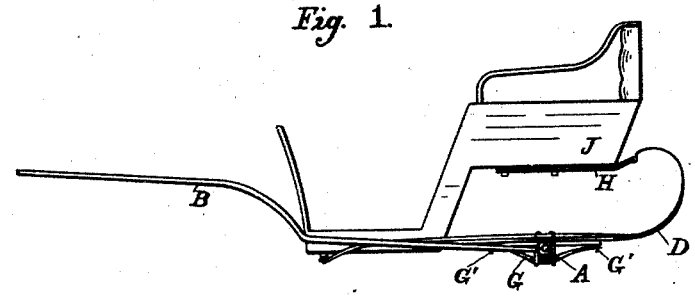
Figure 2:
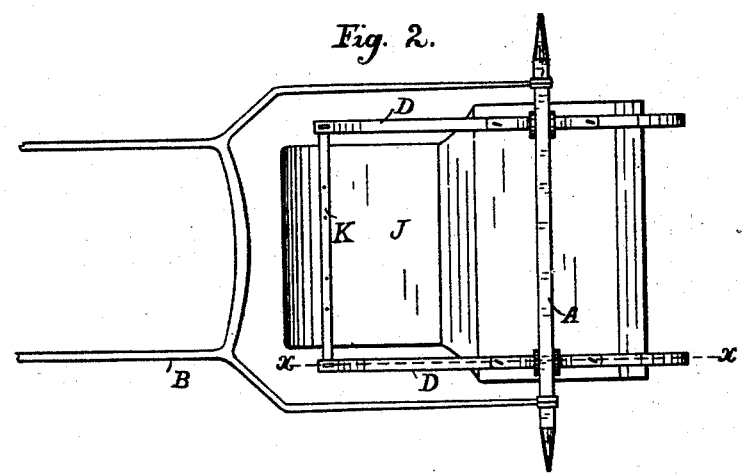
Figure 3:
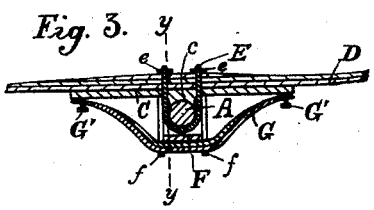
Figure 4:
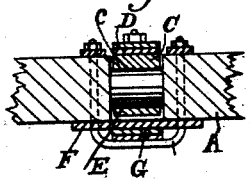
Figure 5:
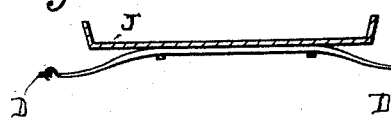
Figure 6:
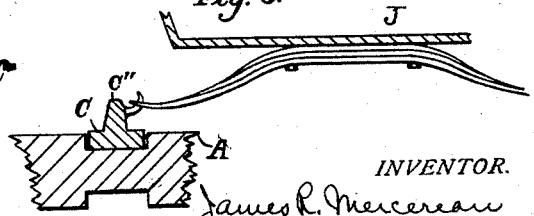

In the drawings, Figure 1 is a perspective view of a cart constructed in accordance with my invention, the wheels being removed; Fig. 2, a bottom plan view of the springs and axle connection; Fig. 3, a vertical section on the line $x\ x$ of Fig. 2; Fig. 4, a cross-section on the line $y\ y$ of Fig. 2; Fig. 5, a view of a modified connection between the body and supporting-spring; Fig. 6, a view of a modified supporting-spring.

Similar letters of reference in the several figures denote similar parts.

The letter A indicates the axle, preferably angular in cross-section, to the ends of which the wheels are applied in the usual manner, and B the thills secured thereto, preferably at the forward side, by suitable clips.

The axle A is reduced and rounded near opposite ends, and resting upon these rounded portions are plates or boxes C, each having a recess $c$ fitting the axle. The main body-supporting springs D, shaped substantially as shown, rest upon these plates, and are secured thereto and to the rounded portion of the axle by loop-clips E, having the legs passing up through the plate and spring and fastened by nuts $e\ e$, this connection permitting the springs and plates to tilt on the axle. Projecting across the rounded parts of the axle are plates F, against the lower sides of which are placed springs G, the ends projecting upward and toward the front and rear of plates C, said springs being secured rigidly to the square portions of the axle by clips $f$ and plates $g$ on top. Through the ends of the springs project thumb-screws G', the ends of which abut against the ends of plates C, thereby holding the latter substantially horizontal regarding the top of the axle, and permitting them to turn only against the action of the springs. The screws permit the adjustment of inclination of the plates relative to the axle, and regulate the tension of the springs, as may be desired.

The upper ends of the springs D are bent over toward the front, as shown and provided with loops through which pass adjustable straps H, secured at opposite ends to the under side of the body J; and the forward end of the body, which is preferably below the axle, is connected to the lower ends of the springs by a cross-strap K, extending beneath it, or by a semi-elliptic spring secured thereto and engaging eyes in the ends of the springs, as in Fig. 5.

It will be seen from the above arrangement that the weight of the body and occupant is supported entirely on the springs D on the axle, while the body is maintained in upright position by the spring connection between the axle and these springs, and that therefore the horse motion to which the body is usually subjected in this form of vehicle is entirely obviated.

Of course any other form of supporting-spring could be used in place of those shown, the plate C serving as the means of connection between the axle-springs and the body-supporting springs. Such an arrangement as this is shown in Fig. 6, wherein the body is supported upon a transversely-extending spring M, secured to the under side of the body, with its ends connected to a standard $C^2$ on plate C, either by the hooks shown or loose links, as usually employed for spring connections. The lower end of the body may be supported from the thill or from the ends of plates C, which may be extended forward, as shown in dotted lines.

By the employment of the springs D (shaped as shown) and the straps connected thereto and to the body I am enabled by adjusting the straps to tilt the body as may be desired, the end of the strap on the body being connected thereto forward of the extreme rear side, as shown.

It is obvious that the two plates C could be connected, if desired, other than through the body, and other forms of supporting-springs employed; also, that the plates C, to which the springs D are connected could be dispensed with and the spring supported directly on the axle, the lower member of the spring in this instance being the equivalent of plate C. Other modifications will readily occur to those skilled in the art, and I therefore do not desire to be confined to precisely the construction herein shown.

I claim as my invention—

1. The combination, with the axle, the body pivotally mounted thereon, and the supporting-springs interposed, of the springs rigidly secured to the axle and engaging the body-support forward and in rear of the axle, substantially as described.

2. The combination, with the axle, the plate pivoted thereon, the supporting-spring connected to the plate, and the body on the spring or springs, of the springs secured to the axle and engaging the plate on opposite sides of the axle, substantially as described.

3. The combination, with the axle, the separate plate pivoted thereon near opposite ends, the supporting-springs on the plates, and the body connected to them, of the springs secured to the axle co-operating with the plates on opposite sides of the axle, substantially as described.

4. The combination, with the angular axle having the rounded portions, the body-supporting plates mounted on the rounded portions of the axle, and the body, of the springs secured rigidly to the lower side of the axle, having the free ends bearing against the plates on opposite sides of the axle, substantially as described.

5. The combination, with the axle, the body, and the plates pivoted on the axle, of the spring secured to the axle, having the adjusting-screws on the end bearing against the pivoted plate, substantially as described.

6. The combination, with the axle, the plates pivoted thereon, the supporting-springs on the plates projecting on opposite sides of the axle, and the body mounted on the springs, of the springs secured to the axle and engaging the pivoted plates on opposite sides thereof, and means for adjusting said springs and plate relative to each other, substantially as described.

JAS. R. MERCEREAU.

Witnesses:
FRED F. CHURCH,
G. A. RODA.